United States Patent
Metzger

[15] 3,691,835
[45] Sept. 19, 1972

[54] VARIABLE-AREA FLOWMETER WITH REMOVABLE METERING TUBE

[72] Inventor: Harold W. Metzger, Willow Grove, Pa.

[73] Assignee: Fischer & Porter Company, Warminster, Pa.

[22] Filed: Jan. 20, 1971

[21] Appl. No.: 108,053

[52] U.S. Cl..................................73/209, 73/323
[51] Int. Cl..............................................G01f 1/00
[58] Field of Search..............73/209, 210, 323, 324

[56] References Cited

UNITED STATES PATENTS 3,203,240   8/1965   McGrath et al. ............73/209
3,232,106   2/1966   Busillo........................73/209

Primary Examiner—Richard C. Queisser
Assistant Examiner—John P. Beauchamp
Attorney—Michael Ebert

[57] ABSTRACT

A flowmeter of the rotameter type in which a variable-area meter tube is supported between the fittings of inlet and outlet assemblies. In order to make possible removal of the tube for cleaning, repair or replacement purposes, the fitting on the outlet assembly is provided with a retractable adapter which normally engages the top end of the tube and which may be fitted out of engagement therewith to permit an ejector spring to push the tube out of the flowmeter frame.

8 Claims, 7 Drawing Figures

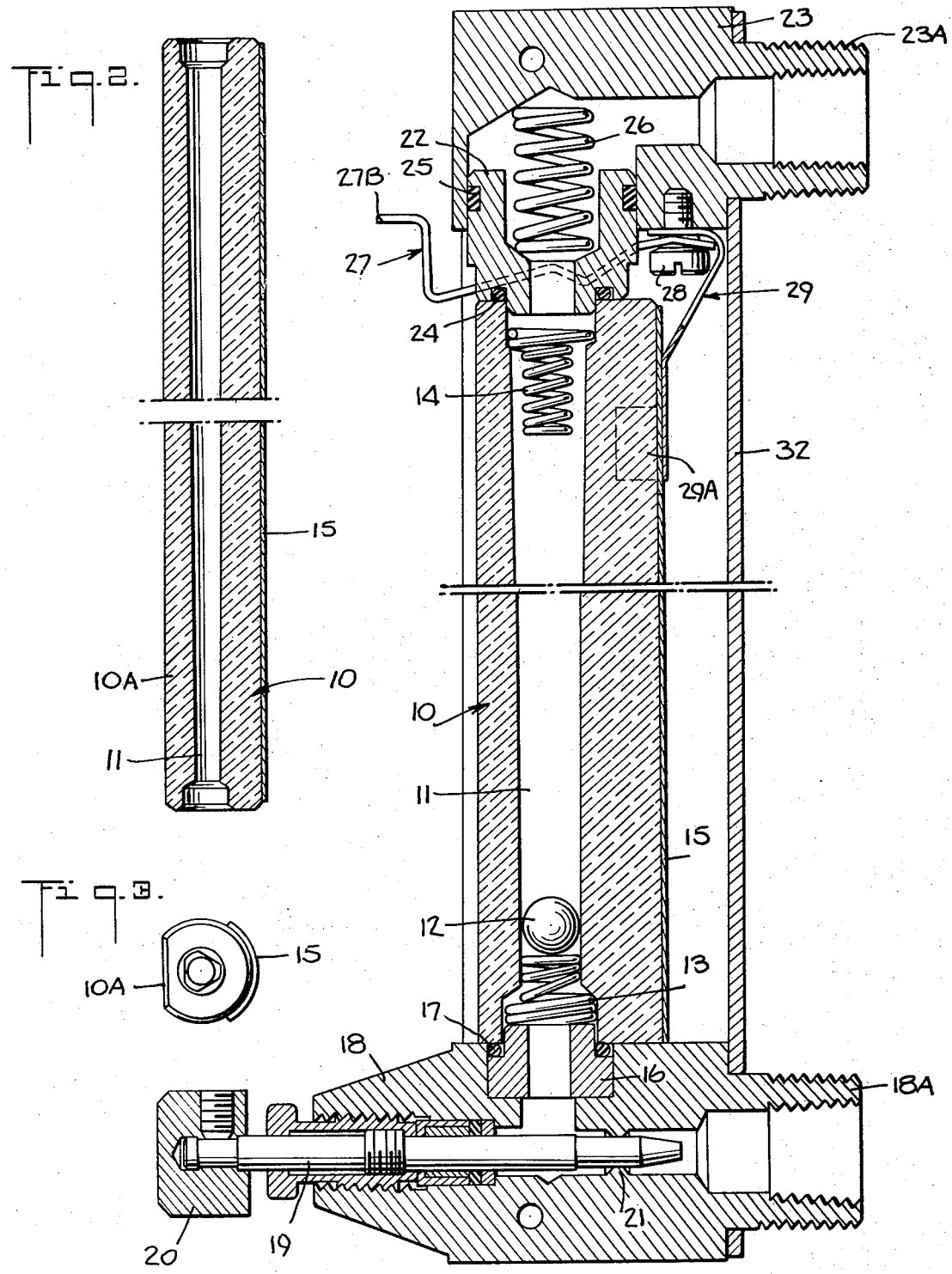

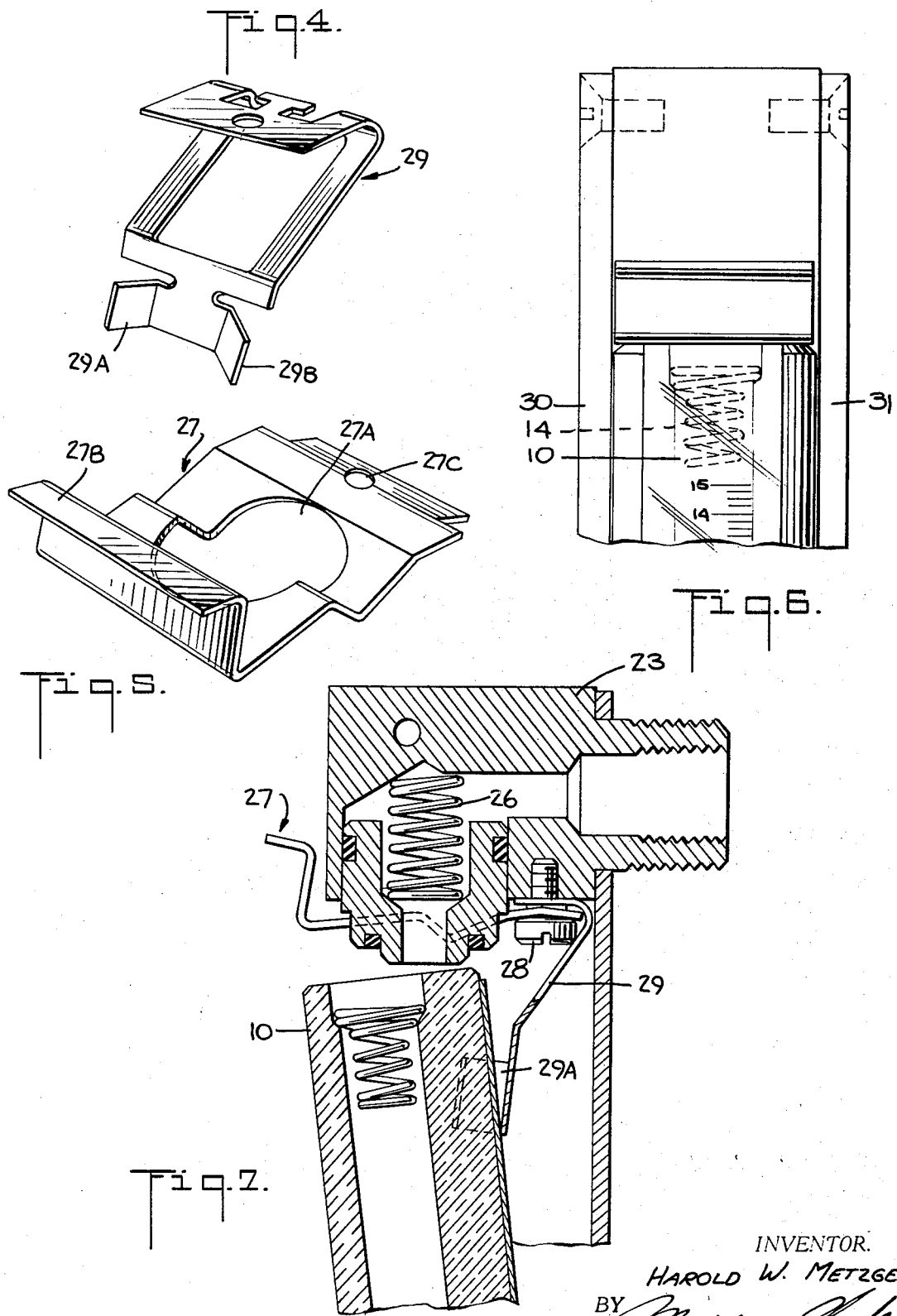

VARIABLE-AREA FLOWMETER WITH REMOVABLE METERING TUBE

BACKGROUND OF THE INVENTION

This invention relates generally to a flowmeter of the rotameter type having a variable-area tube, and more particularly to a rotameter in which the meter tube may be readily removed without disassembling the flowmeter.

In the usual type of rotameter a weighted plummet or float contained in an upright tapered tube is raised to a position of equilibrium between the downward force of the float and the upward force of the fluid flowing past the float through the annular orifice surrounding the float. The term "rotameter" was derived from the fact that plummets originally had slots therein to impart a rotational force for the purpose of centering and stabilizing the float. The present trend, however, is toward guided, non-rotating floats.

In one well-known commercial form of rotameter, such as that disclosed in my prior U.S. Pat. No. 3,342,068, the flowmeter is provided with a tube having a tapered bore affording a variable cross-sectional area. The float disposed in the bore assumes a vertical position depending on the rate of fluid flow, which may be liquid or gas. The vertical position of the float is indicated along a calibrated scale on the front of the tube.

Because the meter tube having a tapered bore is made of glass and is relatively fragile, the tube is supported in a frame or mounting adapted to protect the tube against stresses as well as to effect tight sealing.

With a variable-area flowmeter, one must be able to remove the meter tube in order to clean it as well as to facilitate inspection and replacement of parts. Moreover, one may also wish to replace a meter tube of a given bore size with another tube having a different bore size to afford a different measurement range. Since the flowmeter components, with the exception of the tubes, are otherwise the same, it is more economical, when a different metering scale is required, to merely replace the tube rather than to provide a second flowmeter in which all components, except for the tube, duplicate those of the first flowmeter.

With existing flowmeter designs, the ability to remove a meter tube and to replace the tube with another tube of the same length but of a different range is complicated by the fact that to carry out this operation, the meter must be at least partially dismantled. This is undesirable from the practical standpoint, for it involves not only time, but some degree of skill and care as well as the use of special tools.

SUMMARY OF THE INVENTION

In view of the foregoing, it is the main object of this invention to provide a rotameter having a variable-area tube which may be readily removed and replaced without in any way disassembling the meter and without the use of tools.

More specifically, it is an object of the invention to provide a compact, rectangular-shaped, variable-area flowmeter including a flat-faced, glass metering tube which essentially fills the opening in the meter frame and can be easily removed therefrom.

Also an object of the invention is to provide a flowmeter which operates reliably and accurately and which may be manufactured and sold at relatively low cost.

Briefly stated, these objects are accomplished in a flowmeter having a meter tube supported in a frame between an inlet and an outlet assembly, the outlet assembly including an outlet fitting provided with a retractable outlet adapter to receive the top end of the tube and means to withdraw the adapter from the top end whereby an ejector is then able to push the tube out of the frame therefor.

OUTLINE OF THE DRAWING

For a better understanding of the invention, as well as other objects and further features thereof, reference is made to the following description to be read in conjunction with the accompanying drawing, in which:

FIG. 1 is a vertical section taken through a variable-area flowmeter in accordance with the invention;

FIG. 2 is a separate view of the metering tube, also shown in vertical section;

FIG. 3 is a plan view of the metering tube;

FIG. 4 separately shows the ejector spring included in the meter;

FIG. 5 separately shows the lifter element for the adapter included in the meter;

FIG. 6 is a partial front view of the meter; and

FIG. 7 illustrates the ejection of the meter tube when the adapter is lifted.

DESCRIPTION OF THE INVENTION

Referring now to the drawing, there is shown a flowmeter in accordance with the invention, which includes an open-ended, transparent meter tube 10, preferably fabricated of borosilicate glass, having a precision-molded tapered bore 11 extending longitudinally therein, to provide a variable area to accommodate a float 12.

In practice, each flowmeter may be provided with a set of interchangeable flowmeter tubes, all of them having the same exterior form and dimensions, but with bores of different nominal sizes, say from one-sixteenth to one-quarter inch or more, to afford different measuring ranges.

Float 12 preferably consists of a spherical ball of stainless steel or other non-corrodible material. The float, under fluid pressure, is raised from a lower stop 13 in the form of a helical spring inserted in the bottom of the tube, to an upper stop 14 of similar form inserted at the top of the tube. Tube 10 is formed with a flat face 10A, along which indicia are etched or otherwise formed to define a meter scale. Secured to the rear of the tube is a decal 15 having a white or reflective surface to facilitate reading the front scale.

The bottom end of the tube is seated on the shoulder of an inlet adapter 16 provided with an "O" ring 17 to effect a fluid-tight seal. Adapter 16 is received in a well formed in an inlet fitting, generally designated by numeral 18, the fitting including a nipple 18A to which an inlet pipe may be coupled for supplying fluid to the meter. Fluid flow between inlet nipple 18A and inlet adapter 16 is controlled by a needle valve 19 whose axial position in the fluid passage is varied by means of a knob 20, the valve plug engaging seat 21.

The top end of the tube 10 is seated on the shoulder of a retractable outlet adapter 22 which is slidable within an outlet fitting 23. The shoulder of adapter 22 is provided with an "O" ring 24 to effect a fluid-tight seal between the upper end of tube 10 and the outlet adapter. The sliding adapter also includes a second "O" ring 25 to provide a fluid-tight seal between the adapter and the outlet fitting. The outlet adapter is provided with a nipple 23A for coupling the fluid to an outlet line.

Outlet adapter 22 is downwardly biased by a helical spring 26, one end of which is received within a recess in the adapter, the other end engaging the inner passage wall of outlet fitting 23. Adapter spring 26 urges adapter 22 into engagement with the top end of tube 10 with sufficient pressure to ensure a fluid-tight passage.

In order to release tube 10 for purposes of cleaning, inspection of replacement, the outlet adapter 22 is retracted by means of a lifter element, generally designated by numeral 27. As shown separately in FIG. 5, lifter element 27 is provided with an opening 27A to accommodate outlet adapter 22, one end of the element being bent to define a handle 27B which protrudes from the front end of the meter. The other end of element 27 has a hole 27C therein, making it possible to mount this end on a retaining screw 28 threaded into the body of outlet fitting 23. In practice, the handle or actuating member of the lifter may be made inaccessible except by means of a simple tool, to avoid unauthorized or accidental operation of the lifter.

Also mounted on screw 28 is an ejector spring, generally designated by numeral 29, which is cut and bent to define a pair of spaced arms 29A and 29B for embracing the rear side of meter tube 10. The ejector is biased so that when the outlet adapter is withdrawn from the upper end of tube 10 by raising lifter 27, the ejector then pushes the tube forward, as shown in FIG. 7, to facilitate removal and replacement.

The frame of the meter is formed by a pair of side plates 30 add 31 and a back cover 32 extending between the inlet and outlet fittings, the front of the frame being open to expose the meter tube and to provide access thereto. Nipple 18A of the inlet fitting projects through a first aperture in cover 32, while nipple 23A of the outlet fitting projects through a second aperture in cover 32, the cover maintaining a fixed, spaced relationship between the two fittings.

While there has been shown and described a preferred embodiment of variable-area flowmeter with removable metering tube in accordance with the invention, it will be understood that many changes and modifications may be made therein without, however, departing from the essential spirit thereof. For example, retraction of the outlet adapter may be effected by a knob-operated screw coupled to the adapter and arranged to move the adapter toward or away from the top end of the tube, rather than by means of a spring and lifter assembly as shown in the figures. In either case, when the outlet adapter is retracted, the ejector spring acts to tilt the tube out of the frame so that it may be removed.

To place in a new tube or to return the original tube to the meter, all one need do is to first raise the outlet adapter and then seat the bottom end of the tube on the inlet adapter as well as to press in the tube against the ejector to cause it to assume a vertical position, a which point the outlet adapter may be brought down on the top end of the tube.

It is also to be understood that the invention is not limited to a retractable outlet adapter, for in practice, the inlet adapter may be made retractable, in which event the outlet adapter is fixed.

I claim:

1. A flowmeter of the rotameter type comprising:
   A. an open-ended tube having a bore extending longitudinally therein whose cross-section varies along its length and is adapted to accommodate a float for vertical movement therein as a function of flow rate,
   B. an inlet assembly including an inlet fitting provided with a inlet adapter for receiving the bottom end of the tube for supplying thereto a fluid to be measured,
   C. An outlet assembly including an outlet fitting provided with an outlet adapter for receiving the top end of the tube for discharging fluid therefrom,
   D. means to maintain a fixed relationship between said inlet fitting and said outlet fitting, one of said adapters being retractable within its associated fitting and being normally extended to engage the related end of the tube,
   E. means coupled to said retractable adapter to disengage it from the related end of the tube, and
   F. means coupled to said tube to eject the tube when said retractable adapter is disengaged.

2. A flowmeter as set forth in claim 1, wherein said inlet adapter is fixed and said outlet adapter is retractable to render it withdrawable.

3. A flowmeter as set forth in claim 1 wherein said tube is transparent and is provided with a flat front face having indicia inscribed thereon.

4. A flowmeter as set forth in claim 1, wherein said inlet assembly includes a needle valve to control fluid flow into said tube.

5. A flowmeter as set forth in claim 2, wherein said outlet assembly includes a helical spring urging said outlet adapter toward the top end of said tube, and said means to disengage said retractable outlet adapter is constituted by manually-operated lifter engaging said outlet adapter to withdraw it from engagement with said top end.

6. A flowmeter as set forth in claim 5, wherein said lifter is provided with a handle projecting from the front end of the meter.

7. A flowmeter as set forth in claim 2, wherein said ejector means is constituted by a flat spring having a pair of arms embracing the surface of said tube adjacent the top end thereof.

8. A flowmeter as set forth in claim 1, further including a frame constituted by a pair of side plates and a back cover extending between said inlet and outlet assemblies, the front end of said frame being open to expose said tube.

* * * * *